United States Patent [19]

Bieg

[11] Patent Number: 5,178,498
[45] Date of Patent: Jan. 12, 1993

[54] X-Z-THETA CUTTING METHOD

[75] Inventor: Lothar F. Bieg, Louisville, Colo.

[73] Assignee: The United States of America as represented by the United States Department of Energy, Washington, D.C.

[21] Appl. No.: 713,209

[22] Filed: Jun. 11, 1991

[51] Int. Cl.$^5$ .................................................. B23C 3/00
[52] U.S. Cl. ..................................... 409/132; 409/165; 409/199
[58] Field of Search ............... 409/131, 132, 143, 165, 409/199, 224, 168, 166; 407/12, 37, 60, 61

[56] References Cited

U.S. PATENT DOCUMENTS

| | | |
|---|---|---|
| 508,640 | 11/1893 | Riddell . |
| 2,048,058 | 7/1936 | Comeau ................. 407/61 |
| 2,250,161 | 7/1941 | Johnson ................. 82/12 |
| 2,524,232 | 10/1950 | Onsrud ................. 407/60 |
| 2,543,661 | 2/1951 | Edlich et al. ............. 29/97 |
| 2,791,946 | 5/1957 | Hewett ................. 90/11 |
| 2,821,873 | 2/1958 | Alsman et al. ............ 77/58 |
| 3,118,215 | 1/1964 | Smith ................. 29/27 |
| 3,301,104 | 1/1967 | Matlack ................. 82/12 |
| 3,329,065 | 7/1967 | Vaughn ................. 407/61 |
| 3,626,456 | 12/1971 | Freeborn ................. 82/12 |
| 3,681,830 | 8/1972 | Dupuis ................. 29/95 |
| 3,688,611 | 9/1972 | Neuman ................. 82/12 |
| 3,957,388 | 5/1976 | Jorgensen ............... 408/240 |
| 3,964,367 | 6/1976 | Stoferle et al. ........... 409/199 |
| 4,083,272 | 4/1978 | Miller ................. 82/12 |
| 4,592,684 | 6/1986 | Baker ................. 409/132 |
| 4,936,718 | 6/1990 | Proffitt ................. 407/61 |

FOREIGN PATENT DOCUMENTS

| | | | |
|---|---|---|---|
| 203325 | 10/1908 | Fed. Rep. of Germany | 407/12 |
| 24847 | 2/1980 | Japan ................. | 407/61 |
| 8900473 | 1/1989 | PCT Int'l Appl. ......... | 407/60 |

OTHER PUBLICATIONS

Tool and Manufacturing Engineers Handbook, Fourth Edition, vol. 1, Machining, Society of Manufacturing Engineers, 1983, pp. 10–54 to 10–61.

Primary Examiner—Daniel W. Howell
Attorney, Agent, or Firm—Anne D. Daniel; James H. Chafin; William R. Moser

[57] ABSTRACT

A method for machining a workpiece. The method includes the use of a rotary cutting tool mounted on the end of a movable arm. The arm is adapted to move in a plane perpendicular to the axis of rotation of the cutting tool. The cutting tool has cutting teeth to cut chips of material off of the workpiece in a predetermined size and shape to facilitate better removal of the chips from the workpiece. The teeth can be of different type and length to permit the tool to both rough cut and finish cut the workpiece during machining. The total depth of cut is divided by the number of tool teeth, so that the longest tool always performs the finishing cut.

2 Claims, 2 Drawing Sheets

X-Z-THETA CUTTING METHOD

The United States Government has rights in this invention pursuant to Contract No. DE-AC04-76DP03533 between the U.S. Department of Energy and Rockwell International (now known as EG&G Rocky Flats, Inc.).

BACKGROUND OF THE INVENTION

1 Field of the Invention

The present invention relates to machining of a workpiece and, more particularly, to a method of accurately producing three dimensional shaped objects.

2 Prior Art

In the past, two tool path methods have been known and applied on turning systems for the production of hemispherical shells and other parts of rotation. One is commonly known as the X-Z method, where a single pointed tool is mounted about 45 degrees off the tool post, and two linear slides are used to guide the tool along a pre-programmed contour. Most commercially available turning systems today consist of numerous linear slides. Each slide can be controlled individually, permitting the tool to impose a predetermined shape onto the blank part. The second method, called R-Theta method, is far different from the X-Z method in that the tool is slowly rotated by a rotary slide. The tool is also mounted on a single linear slide, allowing for the tool to be re-positioned in distance from the center point of the rotary slide, thus accommodating different part sizes and shapes.

Each of these methods theoretically produces a metal chip that equals the surface area of the hemishell times the depth of cut, and therefore: $2\pi r^2$ times the depth of cut. Since only a small portion of the total surface area of the part is machined away at one revolution of the part, the chip can be many feet in length, and often the chip forms into a ball or rolls around the tool or tool post. In many cases, if the chips are not removed by manual or mechanical force, this chip formation at or around the tool can damage the part surface.

In the X-Z method used in machining hemishells, since the tool is only located normal or perpendicular to the cutting surface at about the 45 degree area of the hemishell, the chip flow and the tool pressure against the surface of the part is changing continuously. On the other hand, a different area of the tool tip, or tool nose, is in contact with the part depending on the positioning of the tool during machining between the equator and the pole of the part. This imposes the tool nose radius error onto the contour of the part, whereby this tool error has been evaluated to be a major error in the manufacture of hemishell components.

The R-Theta method always keeps the tool perpendicular to the cutting surface due to its rotational motion, keeping the tool pressure at a constant. Since one edge of the tool, rather than a different portion of a radius as in the X-Z method, is interfacing with the surface to be machined, the actual tool nose radius has no influence on the part contour during R-Theta machining. Yet a large burden is placed on the tool by using the same edge to cut the entire part from equator to pole. Any tool wear at the tip of the tool results in a part contour error, where the radial distance of the hemishell gets smaller as the tool wears resulting in a change in the desired contour.

It is an objective of the present invention to provide a new and improved method of machining a three dimensional object that can remove material from a workpiece in predetermined shapes and sizes and can produce several types of cuts at short intervals.

SUMMARY OF THE INVENTION

The foregoing problems are overcome and other advantages are provided by a new and improved method for cutting material from a workpiece.

In accordance with one embodiment of the present invention, a method for cutting material from a workpiece comprises the steps of providing a rotary cutting tool at an end of a positioning arm, the cutting tool being adapted to rotate about a first axis of rotation and the positioning arm being movable about a plane perpendicular to the first axis; rotating the cutting tool about its first axis of rotation; moving the positioning arm and cutting tool in the plane as the cutting tool is rotated about the first axis; and controlling the path of the positioning arm and speed of rotation of the cutting tool to remove material from the workpiece with a predetermined chip size and shape to facilitate better removal of the chips from the workpiece.

In accordance with another embodiment of the present invention, a method of machining a workpiece is provided comprising the steps of providing a rotary cutting tool at an end of a positioning arm, the cutting tool having at least two different cutting teeth, a first rough cut tooth and a second finish cut tooth, the cutting tool being adapted to be rotated about a first axis of rotation and the positioning arm being movable in a plane perpendicular to the first axis; rotating the cutting tool about its first axis of rotation; and moving the positioning arm and cutting tool in the plane perpendicular to the first axis as the cutting tool is rotated such that the second tooth will take substantially the same location as the first tooth in cutting the workpiece to both rough cut and finish cut the workpiece as the tool moves along the surface thereof.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
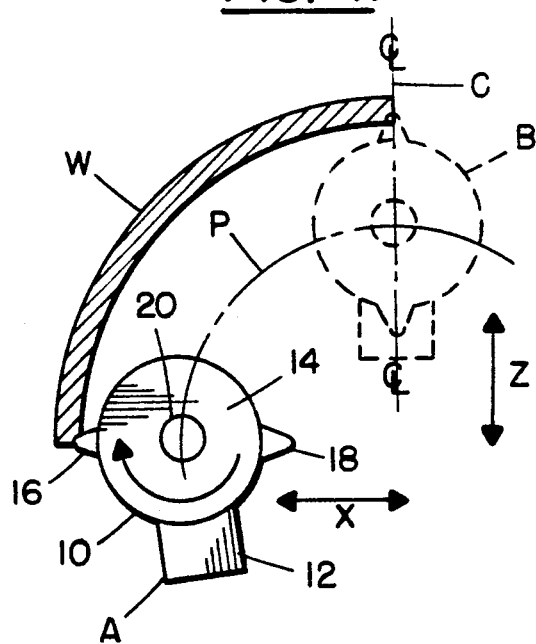
FIG. 1 is a schematic view of a cutting tool, positioning arm, and workpiece being machined.

Referring to FIG. 1, there is shown a schematic view of a workpiece W being machined by a cutting tool 10 incorporated features of the present invention. The cutting tool 10 is connected to the end of a positioning arm 12. The positioning arm 12 is adapted to move the tool 10 in the X and Z directions shown while the workpiece W can be maintained in a stationary position.

Alternatively, the arm 12 could be maintained in a stationary position while the workpiece could be moved. However, in a preferred embodiment, the workpiece W is rotated and the arm 12 is moved as further described below. In the embodiment shown in FIG. 1, the workpiece W is shown in a cross-sectional view and, only one-half of the workpiece W is shown for the sake of clarity. The other side of the workpiece W is a mirror image of the side shown. The workpiece W is intended to be machined as a hemishell shape. The present invention is intended to be capable of machining both the interior and exterior sides of the hemishell. In FIG. 1, the tool is shown in position A at a position for the start of the process of machining the interior side of the hemishell W. Position B shows the tool 10 at a finished position of machining. The workpiece W is rotated about its centerline C such that the entire interior side of the workpiece is machined.

The cutting tool 10 is rotatably mounted to the arm 12 about an axis of rotation perpendicular to the X-Z plane. A suitable means to drive the rotation of the tool 10 might include a motor located at the end of the positioning arm 12 or, a motor located at the other end of the arm 12 with a suitable drive transmission along the positioning arm 12. In the embodiment shown, the cutting tool 10 has a body 14 and two cutting teeth 16 and 18 located at the outer perimeter of the body 14. In a preferred embodiment, the cutting teeth 16 and 18 are removably mounted to the body 14 such that they can be replaced or removed for sharpening. However, the teeth 16 and 18 need not be removably mounted. Also in a preferred embodiment, the two teeth 16 and 18 are different. The first tooth 16 is slightly longer than the second tooth 18. The teeth 16 and 18 are generally provided to machine the workpiece W by making small cuts or chips off of the workpiece. Basically, the center 20 of the tool 10 is guided along a pre-programmed X-Z tool path P. During this path movement, the tool 10 is rotated about the center 20 at a relatively high rate of speed when compared to the rate of movement along the path P. The teeth 16 and 18 make small cuts into the workpiece W; chipping away pieces of the workpiece W. In a preferred embodiment of the invention, the rotational speed of the tool 10 and linear path movement of the tool 10 can be varied to control the length of the chips produced and, the direction of chip flow from the workpiece W. In a preferred method, the best cutting condition would be achieved at a low rotational speed of the tool 10, a low rotational speed of the workpiece W, and a low feed rate of the X-Z linear slide motion.

Figure 2:
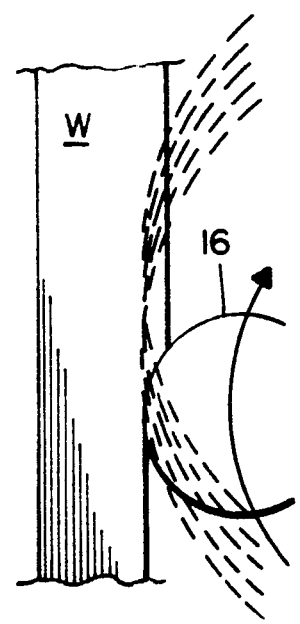
FIG. 2 is an enlarged schematic view of a cutting tool machining a workpiece.

FIG. 2 schematically shows how a tooth 16 as it machines or cuts away at the workpiece W with successive cuts as both the tool is rotated and the workpiece W is rotated. As illustrated in FIG. 2, the tooth 16 will at first encounter the material with its leading edge (small depth of cut). As the tool continues to rotate, the depth of cut increases until it finds it maximum depth, whereby 45 degrees of the tool nose is engaged with the material. From this point on, the depth of cut decreases once again until the tooth 16 leaves the material. This process repeats itself many times depending on the speed of rotation of the tool and the workpiece itself. Therefore, the depth of cut is dependent on the feed rate of the X- and Z- slide, plus the rotational speed of the tool. Yet in any case, the chip produced from this cutting process starts out to be very thin, then gains in width and continues to decrease until the cut is interrupted. Assuming that the chip does not roll up into a spiral, its shape can be described as a triangle.

Rather then defining an X and Z offset for each tooth as required by the X-Z method, the X-Z-Theta method needs only the distance between the largest tooth and its center point for offset data. Each of the X and Z offset is always the same. This offset number can be evaluated by a single transducer finding the high point of the tooth nose radius, making the task of tool setting a more simple and repeatable endeavor. For the machining of the part features, especially inner contours of hemishells, a small tool can be used. To assure the fabrication of workpieces with a diameter as small as three to four inches, a tool with a diameter of 2 inches is preferred. Assuming this tool has hydrostatic bearing surfaces, it can be powered with a drive motor located behind the tool post by use of a belt drive system. Since the tool requires a high speed of rotation, a larger pulley would be mounted at the motor, permitting for a high speed ratio at the tool. This also would help the space constraint by having the larger pulley and motor outside the hemishell component.

Figure 3:
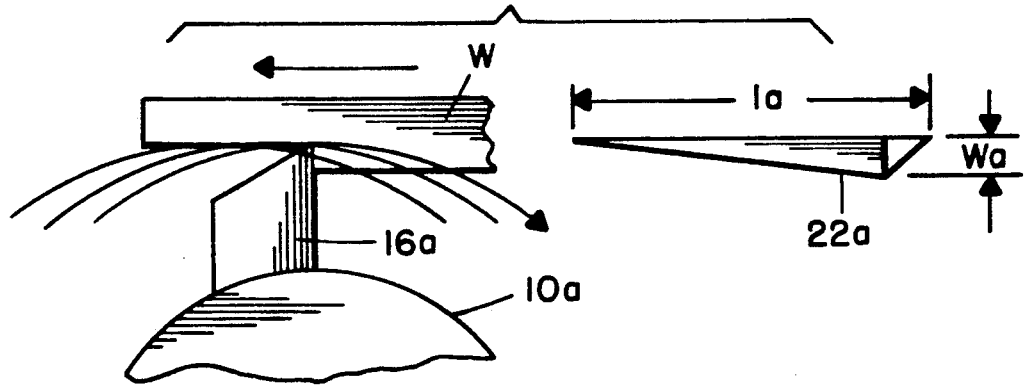
FIG. 3 is a schematic view of a cutting tool machining a workpiece and the resulting chip of material removed from the workpiece.
Figure 4:
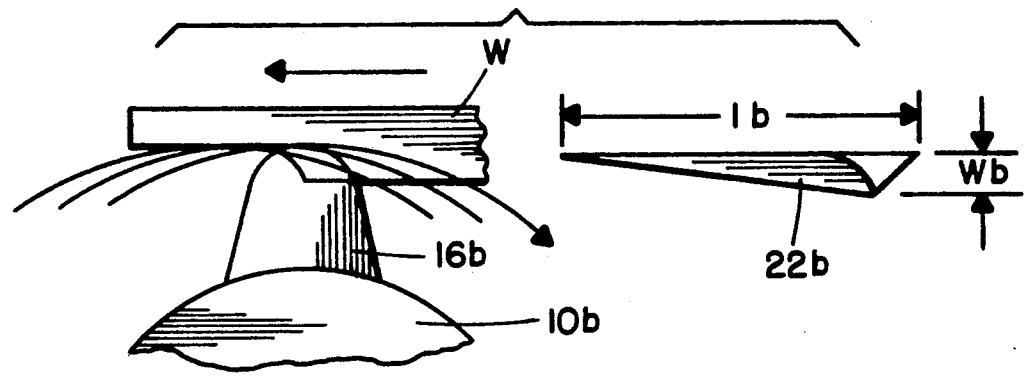
FIG. 4 is a schematic view of a cutting tool machining a workpiece and the resulting chip of material removed from the workpiece.

Referring now to FIGS. 3 and 4, there are shown two different types of tools 10$a$ and 10$b$ having teeth 16$a$ and 16$b$ and, the chips 22$a$ and 22$b$ produced by their cuts. In FIGS. 3 and 4, the application of a straight edge tooth versus a circular edge tooth is illustrated. In both cases the shape of the chip should be nearly the same. The major difference is the amount of surface area interfacing with the material to be cut, where the circular tooth edge has defined advantages. Also, the highly pointed straight edge tooth will be subject to quicker wear. The tool 10$a$ has a straight edge tooth 16$a$. The chip 22$a$ produced has a predetermined chip length $l_a$ and a predetermined chip width $W_a$. The tool 10$b$ has a circular edge tooth 16$b$. The chip 22$b$ produced has a predetermined chip length $L_b$ and a predetermined chip width $W_b$. Any suitable type of tooth can be selected to produce a suitable size and shape chip to facilitate removal and discharge of the chips from the work area.

Figure 5:
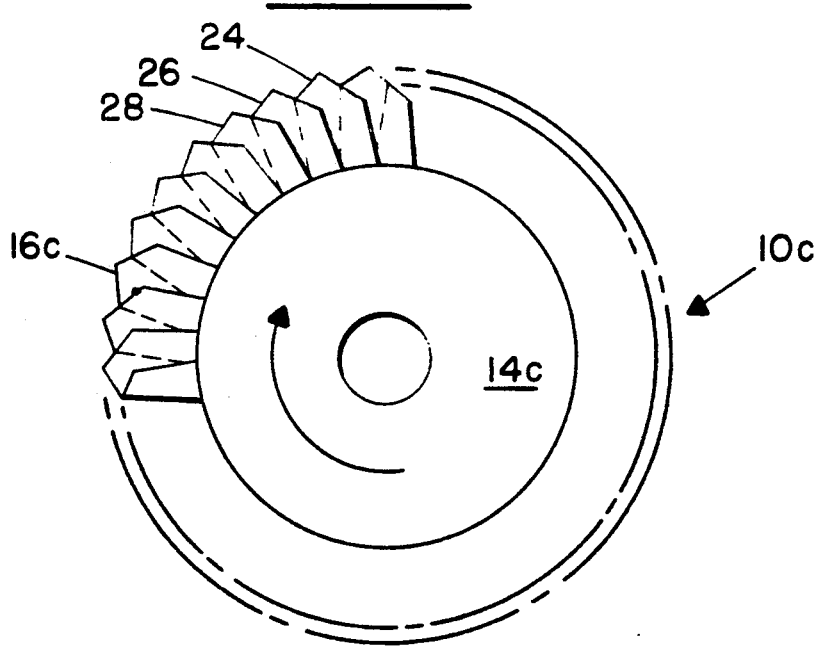
FIG. 5 is a top view of an alternate embodiment of a cutting tool.

Referring now to FIG. 5, there is shown a schematic top view of another embodiment of a tool 10$c$. The tool 10$c$, in the embodiment shown, has a body 14$c$ and a plurality of cutting teeth 16$c$ at the outer perimeter of the body 14$c$. In the embodiment shown, the teeth 16$c$ are slightly tilted relative to the plane of the body 14$c$ such that the teeth 16$c$ partially overlap adjacent teeth. In the embodiment shown, the teeth 16$c$ are not all the same. The tool 10$c$ has sets of adjacent teeth consisting of a rough cut tooth 24, an intermediate cut tooth 26, and a finish cut tooth 28. Thus, as the tool 10$c$ is rotated, it makes all three cuts, rough, intermediate and finish, at virtually the same time. It should be noted however, that any suitable member and type of teeth and sets of teeth could be provided.

It is of importance to understand, that in each embodiment of the invention the total depth of cut is divided by the number of tools. The tooth having the largest distance from the tools center of rotation will always perform the finishing cut. Due to the feed of the linear X-Z motion each and all tool teeth will cut material.

The present invention obviously has many advantages over the prior art. The tool is capable of performing several different types of cuts shortly after one another whereby each tooth used for the subsequent cut will take the location of the previous tooth. The X-Z-Theta cutting method described above is especially suitable for the fabrication of parts with contours such as cylinders, cones, bell shapes, and hemispheres, both inside and outside. Furthermore, due to the nature of the tool, each chip of material removed from a workpiece can be controlled, not only in regard to its width (resulting from the depth of cut), but also in regard to length. The control of chip shape helps to increase control over chip flow direction and can produce a free falling chip out and away from the machined surface. For workpiece features such as grooves, steps, and radii on the surface of a workpiece, the tool could be stopped and locked at predetermined locations. Each of these locations could hold a tooth suitable for its intended feature. Since these special purpose teeth could be mounted at locations substantially shorter from the tool's center point than the normal contour teeth, they would not interfere with each other.

The present invention is easily adaptable to accommodate cutting teeth currently used in contour shape production without any major retrofit. The present invention, due to its chip production control, aids in accountability for exotic or expensive materials. In addition, for potentially hazardous materials, chip control helps to accommodate requirements of automated remote machining without human intervention. Due to the rotation of the tool in combination with a suitable linear feed rate, tool wear or breakdown can be considerably less than in the prior art. The successive cuts of material to divide the required depth of cut into a series of small cuts also minimizes wear on the teeth, reduces forces on the teeth, and reduces heat generation from the cutting process. Since the X-Z-Theta method is not dependent on the tooth nose radius accuracy, any possible tooth nose radius error is not imposed onto the part contour. With the ability to cut both contours and special features, the method and tool can be used to cut virtually all desired workpiece features without changing tools or teeth during the cutting process.

One of the major issues to be evaluated in conjunction with this tool is surface finish performances. Whenever a machining process is performed where the tool is moved in one plane as the part is rotated, essentially a spiral is cut into the surface of the part. This applies to a cylinder, a cone, as well as a sphere, or any feature of rotation. For the present invention, since the rotation (rpm) of the part is relatively high and the feed rate of the tool is low, the pitch of the spiral remains small, and therefore cannot be seen, but can be measured. In any case, small hills and valleys are imposed onto the part surface, whereby the shape of these valleys depend on the size and shape of the tool nose itself.

The X-Z-Theta method will add one more component to the surface finish. As the workpiece is rotated and the tool rotates there will be a frequency imposed onto the surface within each revolution of the part or within the circumference of the workpiece. Just like before, hills and valleys are produced, whereby the valleys will be small in width and the hill tops will be slightly curved depending on the size of the workpiece. The tooth nose size and shape, on the other hand, will not have an effect on the surface finish.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A method for cutting material from a workpiece whereby said material is removed in the form of chips of predetermined size and shape to facilitate removal of said chips from said workpiece comprising:
    rotating said workpiece about a fixed first axis lying within a plane;
    rotating a cutting tool having at least one cutting tooth about a movable second axis, such second axis being positioned perpendicular to said plane;
    moving said cutting tool along a path within said plane to cause said cutting tool to engage said workpiece and cut materials therefrom, and
    regulating the relative rates of rotation of said workpiece and cutting tool and the rate of movement of said cutting tool along said path as required to remove material from said workpiece in the form of chips of predetermined size and shape.

2. A method as in claim 1 wherein said cutting tool is moved along an arced path.

* * * * *